United States Patent
Wang et al.

(10) Patent No.: US 12,509,478 B2
(45) Date of Patent: Dec. 30, 2025

(54) SYSTEM AND METHOD FOR CONTINUOUSLY PRODUCING DIETHYL METHYLPHOSPHONITE

(71) Applicants: ZHEJIANG WYNCA CHEMICAL INDUSTRY GROUP CO., LTD, Zhejiang (CN); TSINGHUA UNIVERSITY, Beijing (CN)

(72) Inventors: Tiefeng Wang, Beijing (CN); Shuguang Zhou, Zhejiang (CN); Xiaocheng Lan, Beijing (CN); Long Qin, Zhejiang (CN); Banghao Li, Beijing (CN); Shenluan Yu, Zhejiang (CN); Huahai Zhang, Beijing (CN); Shengbao Jiang, Zhejiang (CN); Minhai Tu, Zhejiang (CN); Xiaohong Zhu, Zhejiang (CN)

(73) Assignees: ZHEJIANG WYNCA CHEMICAL INDUSTRY GROUP CO., LTD, Zhejiang (CN); TSINGHUA UNIVERSITY, Beijing (CN)

( * ) Notice: Subject to any disclaimer, the term of this patent is extended or adjusted under 35 U.S.C. 154(b) by 561 days.

(21) Appl. No.: 17/924,373

(22) PCT Filed: Nov. 18, 2020

(86) PCT No.: PCT/CN2020/129672
§ 371 (c)(1),
(2) Date: Nov. 10, 2022

(87) PCT Pub. No.: WO2022/073283
PCT Pub. Date: Apr. 14, 2022

(65) Prior Publication Data
US 2023/0183275 A1 Jun. 15, 2023

(30) Foreign Application Priority Data

Oct. 10, 2020 (CN) .......................... 202011078240.5
Oct. 10, 2020 (CN) .......................... 202022246083.6

(51) Int. Cl.
*C07F 9/50* (2006.01)
(52) U.S. Cl.
CPC ..................................... *C07F 9/50* (2013.01)
(58) Field of Classification Search
CPC .............................. C07F 9/50; C07F 9/4816
See application file for complete search history.

(56) References Cited

U.S. PATENT DOCUMENTS

2005/0209105 A1    9/2005  Wang et al.

FOREIGN PATENT DOCUMENTS

CN            1445234 A       10/2003
CN          105713200 A  *    6/2016  ............. C08G 77/08
(Continued)

OTHER PUBLICATIONS

International Search Report for PCT/CN2020/129672 mailed Jul. 16, 2021, ISA/CN.

*Primary Examiner* — Deborah D Carr
(74) *Attorney, Agent, or Firm* — Yue (Robert) Xu; Apex Attorneys at Law, LLP

(57) ABSTRACT

The present invention provides a system for continuously producing diethyl methylphosphonite, comprising a rapid mixing reactor and a material circulation subsystem. An inlet of the rapid mixing reactor is provided with a rapid mixing component; the rapid mixing component comprises a first liquid inlet and a second liquid inlet; the second liquid inlet is used for feeding a material containing methylphosphonous dichloride; the material circulation subsystem comprises a filter, a material distribution unit, an acid binding agent premixer, and a heat exchanger, which are (Continued)

connected in sequence; the filter is also provided with a solid waste outlet; the material distribution unit is also provided with a diethyl methylphosphonite outlet; the acid binding agent premixer is also provided with a reaction raw material inlet and an acid binding agent inlet; an inlet of the filter is connected to an outlet of the rapid mixing reactor; and an outlet of the heat exchanger is connected to the first liquid inlet. A method for continuously producing the diethyl methylphosphonite by using the system can achieve large-scale continuous production of the diethyl methylphosphonite, and has the advantages of high product yield, stable production, and high production benefit.

9 Claims, 3 Drawing Sheets

(56) References Cited

FOREIGN PATENT DOCUMENTS

| | | | |
|---|---|---|---|
| CN | 105949239 | A | 9/2016 |
| CN | 107236002 | A | 10/2017 |
| CN | 108623628 | A | 10/2018 |
| CN | 109836456 | A | 6/2019 |
| CN | 111004280 | A | 4/2020 |
| CN | 111004281 | A | 4/2020 |
| CN | 112159428 | A | 1/2021 |
| CN | 212476593 | U | 2/2021 |
| JP | 06321972 | A | 11/1994 |

* cited by examiner

SYSTEM AND METHOD FOR CONTINUOUSLY PRODUCING DIETHYL METHYLPHOSPHONITE

This application is the national phase of International Application No. PCT/CN2020/129672, titled "SYSTEM AND METHOD FOR CONTINUOUSLY PRODUCING DIETHYL METHYLPHOSPHONITE", filed on Nov. 18, 2020, which claims the priority to Chinese Patent Application No. 202011078240.5, titled "SYSTEM AND METHOD FOR CONTINUOUSLY PRODUCING DIETHYL METHYLPHOSPHONITE", filed on Oct. 10, 2020 with the China National Intellectual Property Administration, and the Chinese Patent Application No. 202022246083.6, titled "SYSTEM FOR CONTINUOUSLY PRODUCING DIETHYL METHYLPHOSPHONITE", filed on Oct. 10, 2020 with the China National Intellectual Property Administration, which are incorporated herein by reference in entirety.

FIELD

The present disclosure relates to the technical field of diethyl methylphosphonite, and more specifically to a system and method for continuously producing diethyl methylphosphonite.

BACKGROUND

Diethyl methylphosphonite ($CH_3P(OEt)_2$), which is an important refined intermediate, has been widely used in the production of flame retardants and herbicides, and is generally produced by reacting methylphosphonous dichloride ($CH_3PCl_2$) and ethanol. The reaction formula of this process is $CH_3PCl_2 + 2EtOH \rightarrow CH_3P(OEt)_2 + 2HCl$. The produced hydrogen chloride will further undergo acidolysis side reaction with diethyl methylphosphonite, thereby reducing the yield of the target product. In order to avoid the acidolysis of diethyl methylphosphonite by hydrogen chloride, it is necessary to neutralize hydrogen chloride in time by introducing an acid-binding agent. These reactions are fast reaction processes, in which the mixing degree of each ingredient significantly affects the selectivity for the target product, so a reactor capable of rapidly blending is required to ensure the selectivity for the target product. On the other hand, the main reaction and the acid binding reaction are strongly exothermic processes. When the reaction is completed under rapid mixing, the exothermic heat is intensive and it is difficult to transfer heat through conventional heat exchange components. Therefore, it is necessary to develop a reaction system to optimize the continuous production process of diethyl methylphosphonite.

Currently, the process for producing diethyl methylphosphonite by using methylphosphonous dichloride and ethanol as raw material typically uses a stirring tank as reactor. For example, the Chinese Patent with a Publication No. CN107236002A discloses a method for intermittently synthesizing diethyl methylphosphonite by using sodium ethoxide as an acid-binding agent in a stirring tank. The Chinese Patent with a Publication No. CN109836456A discloses a method for intermittently synthesizing diethyl methylphosphonite by using calcium oxide as an acid-binding agent in a stirred reactor. The Chinese Patent with a Publication No. CN108623628A discloses a method for continuously producing diethyl methylphosphonite in a stirring tank. The Chinese Patent with a Publication No. CN105949239A discloses a method for continuously producing diethyl methylphosphonite by using three stirring tanks connected in series. The above-mentioned technical solutions realize the mixing of materials by adding methylphosphonous dichloride dropwise to the solvent containing an acid-binding agent and ethanol with mechanical stirring. However, the use of a stirring tank to produce diethyl methylphosphonite has the following defects: (1) the mechanical stirring of the stirring tank fails to rapidly and uniformly blend the materials, which limits the reaction of the acid-binding agent and hydrogen chloride, and results in low target product yield since the acidolysis of diethyl methylphosphonite occurs easily; (2) heat exchange components in the stirring tank are limited by stirring paddles, resulting in low processing capacity of a single device, and in industrial-scale production, multiple reactors are often operated in parallel, causing high equipment cost; and (3) due to the existence of stirring paddle rotating parts in the reactor, the sealing requirements of the reactor are more stringent.

In addition, the Chinese Patents with a Publication No. CN111004280A and CN111004281A respectively published a method for continuously producing diethyl methylphosphonite, in which a microreactor with tortuous flow channels and a mixing chamber enables rapid mixing, and an acid-binding agent is added at the outlet of the reactor for deacidification. Nevertheless, the internal structure of the microreactor is complex, the production capacity of a single reactor is low, and the equipment cost for large-scale production is high; at the same time, the channel of the microreactor is small, which is not suitable for acid-binding neutralization reactions where solid particles are generated.

In summary, developing a reaction system capable of continuously producing diethyl methylphosphonite in large scale with high target product yield and good production efficiency has become a technical problem to be solved urgently by those skilled in the art.

SUMMARY

In view of that, the present disclosure aims to provide a system and method for continuously producing diethyl methylphosphonite. The system provided by the present disclosure can continuously produce diethyl methylphosphonite in large scale, and has advantages including high product yield, stable production and high production efficiency.

The present disclosure provides a system for continuously producing diethyl methylphosphonite, which comprises:
  a rapid mixing reactor and a material circulation subsystem;
  wherein the inlet of the rapid mixing reactor is provided with a rapid mixing member comprising a first liquid inlet and a second liquid inlet; the second liquid inlet is configured to feed a methylphosphonous dichloride-containing material; and
  the material circulation subsystem comprises a filter, a material distributing unit, an acid-binding agent premixer and a heat exchanger that are sequentially connected, wherein the filter is provided with a solid waste outlet, the material distributing unit is provided with an diethyl methylphosphonite outlet, the acid-binding agent premixer is provided with an reaction raw material inlet and an acid-binding agent inlet;
  wherein an inlet of the filter is connected with an outlet of the rapid mixing reactor, and an outlet of the heat exchanger is connected with the first liquid inlet.

Preferably, the rapid mixing member is selected from a venturi nozzle, a jet nozzle or a hedging flow nozzle.

Preferably, the rapid mixing reactor is further provided with a vacuumization unit.

Preferably, the filter is selected from the group consisting of a plate and frame filter, a leaf filter, a rotary drum filter, a centrifugal filter and combinations thereof.

Preferably, the acid-binding agent premixer is selected from the group consisting of an absorption tower, a bubbling bed, an airlift loop reactor, a jet reactor, mechanically stirring tank and combinations thereof.

The present disclosure further provides a method for continuously producing diethyl methylphosphonite using the system recited in the above-mentioned technical solution, comprising:

step a), mixing an ethanol-containing reaction raw material, an acid-binding agent and a circulating material in the acid-binding agent premixer uniformly, to obtain a mixed material;

step b), cooling the mixed material obtained in step a) by the heat exchanger and then introducing the mixed material into the rapid mixing reactor via the first liquid inlet; and at the same time introducing a methylphosphonous dichloride-containing material into the rapid mixing reactor via the second liquid inlet, and rapidly and uniformly mixing the mixed material and the methylphosphonous dichloride-containing material under the action of the rapid mixing member to carry out a reaction, to obtain a reaction mixture; and step c), passing the reaction mixture obtained in step b) through a filter to remove solid waste generated from the reaction, and then introducing the reaction mixture into the material distributing unit, to obtain diethyl methylphosphonite and a circulating material separately, wherein the circulating material is used in step a).

Preferably, in step a), the acid-binding agent is ammonia or an organic amine having a structural formula of $NR_1R_2R_3$, wherein $R_1$, $R_2$, and $R_3$ are independently selected from H, methyl, ethyl, propyl, butyl or phenyl.

Preferably, in step b), the methylphosphonous dichloride in the methylphosphonous dichloride-containing material and the ethanol and the acid-binding agent in the mixed material have a molar ratio of 1:(0.5-50):(1-15).

Preferably, in step b, the reaction is performed at a temperature from −40° C. to 100° C.

Preferably, in step c), the diethyl methylphosphonite and the circulating material obtained from the material distributing unit have a mass ratio of 1:(0.1-100).

The present disclosure provides a system for continuously producing diethyl methylphosphonite, comprising a rapid mixing reactor and a material circulation subsystem; wherein an inlet of the rapid mixing reactor is provided with a rapid mixing member comprising a first liquid inlet and a second liquid inlet; the second liquid inlet is configured to feed a methylphosphonous dichloride-containing material; and the material circulation subsystem comprises a filter, a material distributing unit, an acid-binding agent premixer and a heat exchanger that are sequentially connected, wherein the filter is provided with a solid waste outlet, the material distributing unit is provided with an diethyl methylphosphonite outlet, the acid-binding agent premixer is provided with an reaction raw material inlet and an acid-binding agent inlet; wherein an inlet of the filter is connected with an outlet of the rapid mixing reactor, and an outlet of the heat exchanger is connected with the first liquid inlet. Compared with the existing technology, the system for continuously producing diethyl methylphosphonite provided by the present disclosure achieve rapid and uniform mixing of the components through the rapid mixing member without need of additional mechanical stirring. The system has good mixing effect and simple structure. It is suitable for large-scale production. Moreover, the heat of reaction is removed through the material circulation subsystem, so that the entire production process is performed in mild conditions and cost-effective. The method for continuously producing diethyl methylphosphonite using this system can achieve large-scale continuous production of diethyl methylphosphonite, and has the advantages of high product yield, stable production and high production efficiency.

DETAILED DESCRIPTION

Hereinafter, the technical solutions of this application will be described clearly and completely, in conjunction with the embodiments of this application. Obviously, the described embodiments are only part of the embodiments of this application, rather than all the embodiments. Based on the embodiments in this application, all other embodiments obtained by a person having ordinary skill in the art without creative labor should fall within the protection scope of this invention.

The present disclosure provides a system for continuously producing diethyl methylphosphonite, comprising:

a rapid mixing reactor and a material circulation subsystem;

wherein an inlet of the rapid mixing reactor is provided with a rapid mixing member comprising a first liquid inlet and a second liquid inlet; the second liquid inlet is configured to feed a methylphosphonous dichloride-containing material;

the material circulation subsystem comprises a filter, a material distributing unit, an acid-binding agent premixer and a heat exchanger that are sequentially connected, wherein the filter is provided with a solid waste outlet, the material distributing unit is provided with an diethyl methylphosphonite outlet, the acid-binding agent premixer is provided with an reaction raw material inlet and an acid-binding agent inlet; and an inlet of the filter is connected with an outlet of the rapid mixing reactor, and an outlet of the heat exchanger is connected with the first liquid inlet.

In FIGS. 1-6, 1 is the inlet of the rapid mixing reactor, 2 is the rapid mixing member, 3 is the main body of the rapid mixing reactor, 4 is the filter, 5 is the material distributing unit, 6 is the acid-binding agent premixer, 7 is the heat exchanger, 8 is the rapid mixing reactor, and 9 is the material circulation subsystem.

In the present disclosure, the system for continuously producing diethyl methylphosphonite comprises a rapid mixing reactor and a material circulation subsystem, wherein the rapid mixing reactor is a key component for mixing and reacting various raw materials. In the present disclosure, the main body of the rapid mixing reactor is a reaction kettle well known to those skilled in the art, and the rapid mixing reactor is preferably provided with a vacuumization unit. In the present disclosure, the vacuumization unit is preferably an evacuation interface that is connected with a vacuum system for maintaining the vacuum condition in the reactor.

In the present disclosure, the inlet of the rapid mixing reactor is provided with a rapid mixing member comprising a first liquid inlet and a second liquid inlet, wherein the second liquid inlet is configured to feed a methylphosphonous dichloride-containing material, and the first liquid inlet is connected with the outlet of the material circulation subsystem.

Figure 2:
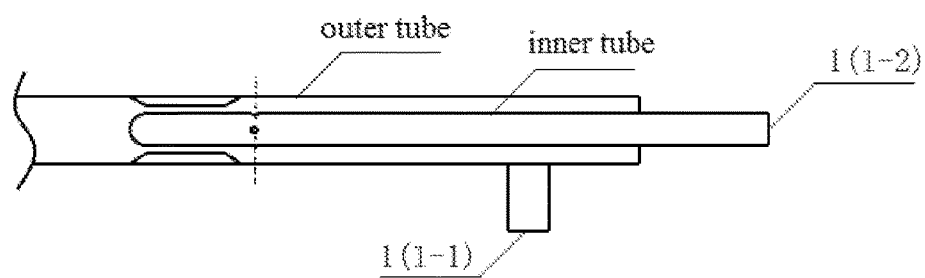
FIG. 2 is a schematic structure diagram showing a venturi nozzle.

In the present disclosure, the rapid mixing member is preferably selected from a venturi nozzle, a jet nozzle or a hedging flow nozzle. The venturi nozzle is composed of a nozzle inner tube and a nozzle outer tube, as shown in FIG. 2. One end of the nozzle inner tube is connected with the second liquid inlet 1(1-2), and the other end is a closed end with a small jet hole arranged on the pipe wall near the blind end. One end of the nozzle outer tube is connected with the first liquid inlet 1(1-1), and the other end is communicated with the chamber of the rapid mixing reactor. The nozzle outer tube includes a middle neck section, a flared inlet and a flared outlet, wherein the ratio of the diameter of the neck section to the diameter of the inlet is 0.1-0.8; the nozzle inner tube and the nozzle outer tube are installed concentrically; the nozzle inner tube is arranged with several jet holes, which are uniformly distributed on the circumference of several cross-sections of the nozzle inner tube, wherein the cross-sections is located at the flared inlet of the nozzle outer tube.

Figure 4:
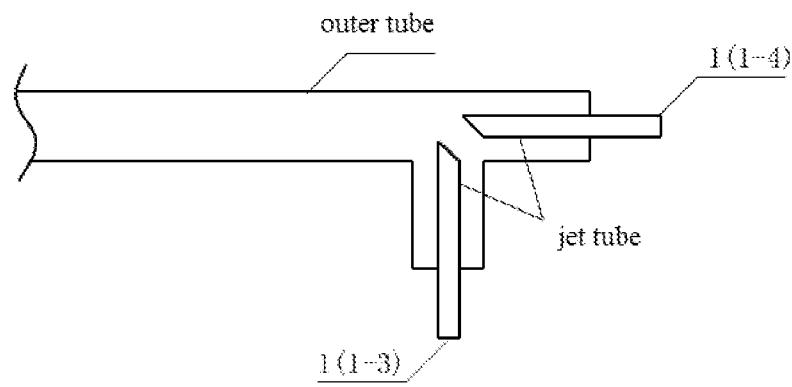
FIG. 4 is a schematic structure diagram showing a jet nozzle.

In the present disclosure, the jet nozzle is composed of an outer tube and two jet tubes, as shown in FIG. 4. One end of the jet tubes is connected with the liquid inlets, and the other end is a 450 cross-section cut. The two jet tubes are arranged with an included angle of 90°, and the cut sections of the two jet tubes are parallel to each other. On end of the nozzle outer tube is connected with the jet tube, the other end is communicated with the chamber of the rapid mixing reactor.

Figure 6:
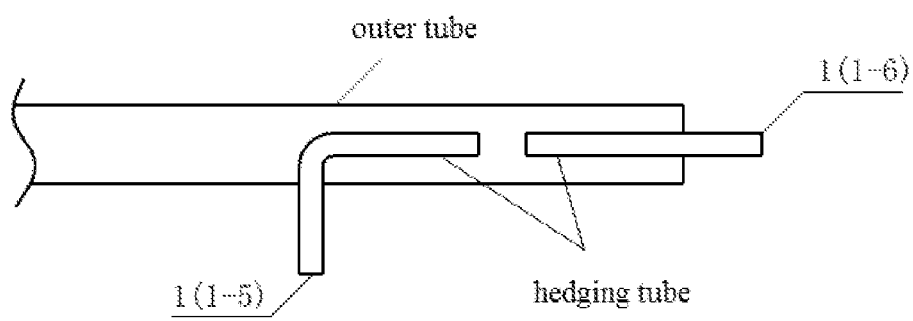
FIG. 6 is a schematic structure diagram showing a hedging flow nozzle.

In the present disclosure, the hedging flow nozzle is composed of an outer tube and two hedging tubes, as shown in FIG. 6. One end of the each hedging tubes is connected with a liquid inlet, and the other end is a liquid injection port. The liquid injection ports of the two hedging tubes are in a hedging arrangement. One end of the nozzle outer tube is connected with a hedging tube, and the other end is communicated with the chamber of the rapid mixing reactor.

In the present disclosure, the rapid mixing reactor can rapidly and uniformly mix the materials through the abovementioned rapid mixing member without need of additional mechanical stirring. The rapid mixing reactor has good mixing effect and simple structure. It is suitable for large-scale production.

In the present disclosure, the heat of reaction is removed through the material circulation subsystem, so that the entire production process is performed in mild conditions and the economy is improved. In the present disclosure, the material circulation subsystem comprises a filter, a material distributing unit, an acid-binding agent premixer and a heat exchanger that are connected sequentially, wherein the inlet of the filter is connected with the outlet of the rapid mixing reactor, and the outlet of the heat exchanger is connected with the first liquid inlet, so as to achieve the integral combination of the rapid mixing reactor and the material circulation subsystem.

In the present disclosure, the filter is configured to remove solid components generated in the rapid mixing reactor and obtain liquid components for further processing. Preferably, the filter is further provided with a solid waste outlet. In the present disclosure, the filter is preferably selected from the group consisting of a plate and frame filter, a leaf filter, a rotary drum filter, a centrifugal filter and combinations thereof.

In the present disclosure, the inlet of the material distributing unit is connected with the liquid outlet of the filter for distributing the liquid from the outlet of the filter. An outlet of the material distributing unit is connected with the circulating material inlet of the acid-binding agent premixer, and another outlet is an outlet for collecting the product of the reaction system, i.e., the outlet of diethyl methylphosphonite.

In the present disclosure, the acid-binding agent premixer is configured to mix parts of the raw materials and circulating materials. The acid-binding agent premixer is provided with a circulating material inlet, which is connected with the circulating material outlet of the material distributing unit. The acid-binding agent premixer is preferably provided with a reaction raw material inlet and an acid-binding agent inlet. In the present disclosure, the acid-binding agent premixer is preferably selected from the group consisting of an absorption tower, a bubbling bed, an airlift loop reactor, a jet reactor, a mechanically stirring tank and combinations thereof.

In the present disclosure, the heat exchanger is configured to control the temperature of the circulating material. The inlet of the heat exchanger is connected with the outlet of the acid-binding agent premixer, and the outlet of the heat exchanger is connected with the first liquid inlet.

The system for continuously producing diethyl methylphosphonite provided by the present disclosure can rapidly and uniformly mix the components through the rapid mixing member without need of additional mechanical stirring. The system has good mixing effect and simple structure. It is suitable for large-scale production. Moreover, the heat of reaction is removed through the material circulation subsystem, so that the entire production process is performed in mild conditions and cost-effective. Thus, this system is of great significance and value.

The present disclosure further provides a method for continuously producing diethyl methylphosphonite using the system recited in the above-mentioned technical solution, comprising:

step a), mixing an ethanol-containing reaction raw material, an acid-binding agent and a circulating material in the acid-binding agent premixer uniformly, to obtain a mixed material;

step b), cooling the mixed material obtained in step a) by the heat exchanger and then introducing the mixed material into the rapid mixing reactor via the first liquid inlet; and at the same time introducing a methylphosphonous dichloride-containing material into the rapid mixing reactor via the second liquid inlet, and rapidly and uniformly mixing the mixed material and the methylphosphonous dichloride-containing material under the action of the rapid mixing member to carry out a reaction, to obtain a reaction mixture; and step c), passing the reaction mixture obtained in step b) through a filter to remove solid waste generated from the reaction, and then introducing the reaction mixture into the material distributing unit, to obtain diethyl methylphosphonite and a circulating material separately, wherein the circulating material is used in step a).

According to the present disclosure, first, the ethanol-containing reaction raw material, the acid-binding agent and the circulating material are well mixed in the acid-binding agent premixer, to obtain a mixed material. In the present disclosure, the ethanol-containing reaction raw material is a raw material for producing diethyl methylphosphonite well known to those skilled in the art.

In the present disclosure, the acid-binding agent is preferably ammonia or an organic amine having a structural formula of $NR_1R_2R_3$, where $R_1$, $R_2$, and $R_3$ are independently selected from H, methyl, ethyl, propyl, butyl or phenyl, and more preferably are ammonia or triethylamine.

In the present disclosure, the mixed material preferably further includes solvent. The solvent is preferably selected from the group consisting of an aliphatic petroleum solvent, an aliphatic ether, an aromatic petroleum solvent and combinations thereof, including a petroleum ether with a boiling range of 30-80° C., pentane, hexane, heptane, octane, toluene, xylene and trimethylbenzene, and more preferably hexane, heptane, xylene or trimethylbenzene.

In the present disclosure, after the mixed material is obtained, the obtained mixed material is cooled by a heat exchanger, and then enters the rapid mixing reactor via the first liquid inlet. At the same time, the methylphosphonous dichloride-containing material enters the rapid mixing reactor via the second liquid inlet, and the mixed material and the methylphosphonous dichloride-containing material are rapidly and uniformly mixed under the action of the rapid mixing member to carry out a reaction, to obtain a reaction mixture.

In the present disclosure, the methylphosphonous dichloride-containing material preferably further includes a solvent. The solvent is preferably selected from the group consisting of an aliphatic petroleum solvent, an aliphatic ether, an aromatic petroleum solvent and combinations thereof, including petroleum ether with a boiling range of 30-90° C., pentane, hexane, heptane, octane, toluene, xylene and trimethylbenzene, and more preferably hexane, heptane, xylene or trimethylbenzene.

In the present disclosure, the temperature is preferably cooled to a range from −40° C. to 40° C., more preferably from −15° C. to 20° C., and still more preferably from 0° C. to 10° C., i.e., the temperature of the mixed material entering the inlet of the rapid mixing reactor. Moreover, the temperature of the methylphosphonous dichloride-containing material entering the inlet of the rapid mixing reactor is the same as the temperature of the mixed material entering the inlet of the rapid mixing reactor.

In the present disclosure, the methylphosphonous dichloride in the methylphosphonous dichloride-containing material and the ethanol and the acid-binding agent in the mixed material preferably have a molar ratio of 1:(0.5-50):(1-15), and more preferably 1:(2-8):(2-6).

In the present disclosure, the methylphosphonous dichloride in the methylphosphonous dichloride-containing material and the total solvent in the mixed material and the methylphosphonous dichloride-containing material preferably have a molar ratio of 1:(0.5-10), and more preferably 1:(1-5).

In the present disclosure, the temperature of the reaction is preferably from −40° C. to 100° C., more preferably from −40° C. to 80° C., still more preferably from −15° C. to 50° C., and most preferably from 0° C. to 40° C.

In the present disclosure, after the reaction mixture is obtained, the obtained reaction mixture is passed through a filter to remove the solid waste generated from the reaction, and then enters the material distributing unit, to obtain diethyl methylphosphonite and the circulating material separately. The circulating material is used to step a).

In the present disclosure, the material distributing unit distributes part of the material (the circulating material) into the circulating material inlet of the acid-binding agent premixer, and part of the material (diethyl methylphosphonite) is collected as the reaction product. The diethyl methylphosphonite obtained from the material distributing unit and the circulating material preferably have a mass ratio of 1:(0.1-100), more preferably 1:(0.1-50), and still more preferably 1:(2-10).

The present disclosure has the following beneficial effects:

The system and method for continuously producing diethyl methylphosphonite provided by the present disclosure can replace the production process using batch stirring tank currently applied in industry, the retention time of the reactants in the reactor is greatly shortened, and the processing capacity of a single reactor is greatly shortened, thereby reducing equipment investment and production costs.

According to the system and method for continuously producing diethyl methylphosphonite provided by the present disclosure, the acid-binding agent in gas phase or liquid phase is dissolved in the reaction material entering the reactor, so that hydrogen chloride is in-situ rapidly removed, and the yield of diethyl methylphosphonite is increased.

According to the system and method for continuously producing diethyl methylphosphonite provided by the present disclosure, the material is uniformly mixed in the liquid phase by the rapid mixing member of the reactor, and the reactor is simple in form with good airtightness, so that the safety and environmental friendliness of the production are improved.

The system and method for continuously producing diethyl methylphosphonite provided by the present disclosure can in situ remove the hydrogen chloride causing the acidolysis of diethyl methylphosphonite, suppressing the occurrence of side-reaction fundamentally, thereby reducing the sensitivity of the reaction process to temperature and eliminating the need to arrange complicated heat exchange members inside the reactor, so that the equipment investment is reduced and the stability of the production is improved.

The present disclosure provides a system for continuously producing diethyl methylphosphonite, comprising a rapid mixing reactor and a material circulation subsystem. The rapid mixing reactor is provided, at an inlet thereof, with a rapid mixing member comprising a first liquid inlet and a second liquid inlet. The second liquid inlet is configured to feed a methylphosphonous dichloride-containing material. The material circulation subsystem comprises a filter, a material distributing unit, an acid-binding agent premixer and a heat exchanger that are sequentially connected, wherein the filter is provided with a solid waste outlet, the material distributing unit is provided with an diethyl methylphosphonite outlet, and the acid-binding agent premixer is provided with an reaction raw material inlet and an acid-binding agent inlet. An inlet of the filter is connected with an outlet of the rapid mixing reactor, and an outlet of the heat exchanger is connected with the first liquid inlet. Compared with the existing technology, the system for continuously producing diethyl methylphosphonite provided by the present disclosure can rapidly and uniformly mix the components through the rapid mixing member without need of additional mechanical stirring. The system has good mixing effect and simple structure. It is suitable for large-scale production. Moreover, the heat of reaction is removed through the material circulation subsystem, so that the entire production process is performed in mild conditions and cost-effective. The method for continuously producing diethyl methylphosphonite using this system can achieve large-scale continuous production of diethyl methylphosphonite, and has the advantages of high product yield, stable production and high production efficiency.

In order to further illustrate the present disclosure, the following examples are used for detailed description.

EXAMPLES

Hereinafter, the present disclosure will be further described in detail through the examples below.

Example 1

Figure 1:
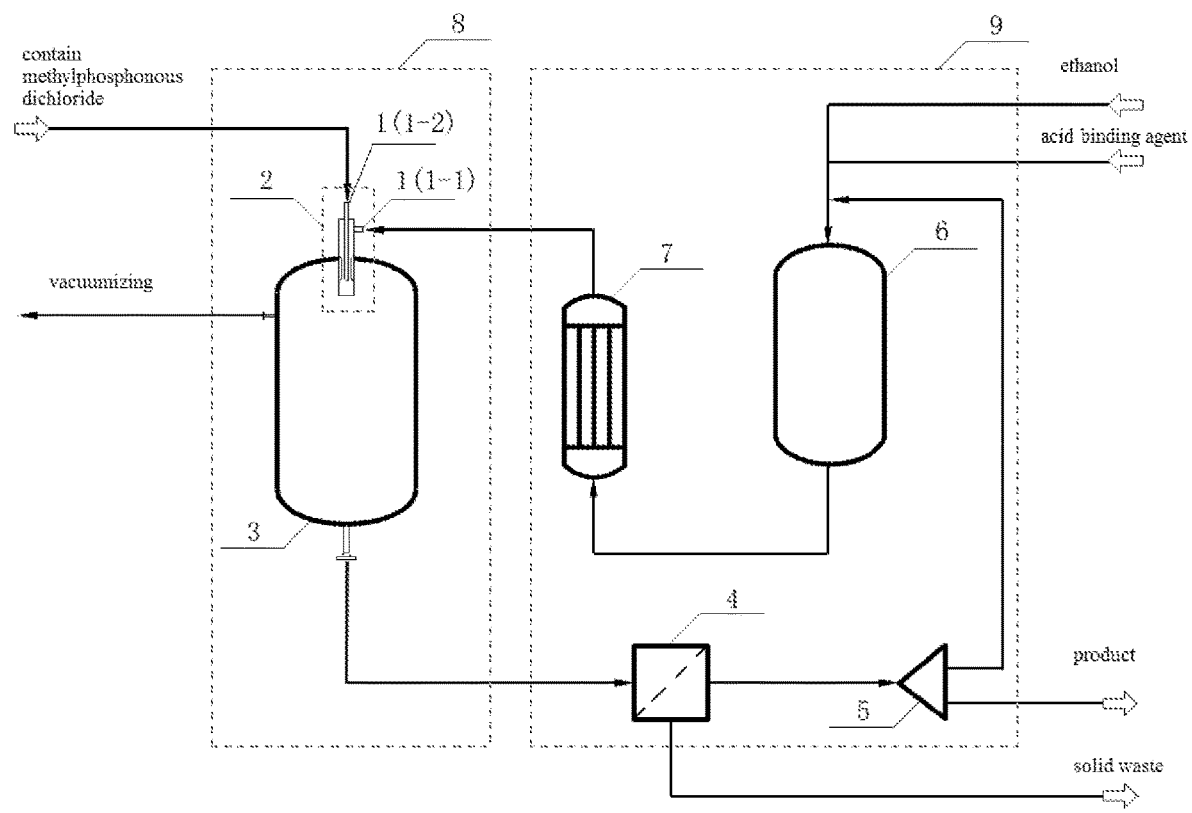
FIG. 1 is a schematic structure diagram showing the system for continuously producing diethyl methylphosphonite provided in Example 1.

FIG. 1 is a schematic structure diagram showing the system for continuously producing diethyl methylphosphonite provided in Example 1. The system includes a rapid mixing reactor (8) and a material circulation subsystem (9). An inlet of the rapid mixing reactor (8) is arranged with a rapid mixing member (2). The rapid mixing member (2) is a venturi nozzle, as shown in FIG. 2. The material circulation subsystem (9) includes a filter (4), a material distributing unit (5), an acid-binding agent premixer (6) and a heat exchanger (7).

As shown in FIG. 1, the rapid mixing member (2) includes a first liquid inlet 1(1-1) and a second liquid inlet 1(1-2). The outlet of the rapid mixing reactor (8) is connected with the inlet of the filter (4) to remove the solid components generated in the rapid mixing reactor (8). The liquid outlet of the filter (4) is connected with the material distributing unit (5), wherein part of the liquid is collected as a product, and part of the liquid enters the acid-binding agent premixer (6). The outlet of the acid-binding agent premixer (6) is connected with the hot material flow inlet of the heat exchanger (7). The hot material flow outlet of the heat exchanger (7) is connected with the first liquid inlet 1 (1-1) of the rapid mixing member (2).

FIG. 2 is a schematic structure diagram of a venturi nozzle. The venturi nozzle is composed of a nozzle inner tube and a nozzle outer tube. One end of the nozzle inner tube is connected with the second liquid inlet 1 (1-2), and the other end is a closed end with a small jet hole arranged on the pipe wall near the blind end. One end of the nozzle outer tube is connected with the first liquid inlet 1 (1-1), and the other end is communicated with the chamber of the rapid mixing reactor. The nozzle outer tube includes a middle neck section, a flared inlet and a flared outlet, wherein the ratio of the diameter of the neck section to the diameter of the inlet is 0.1-0.8; the nozzle inner tube and the nozzle outer tube are installed concentrically; the nozzle inner tube is arranged with several jet holes, which are uniformly distributed on the circumference of several cross-sections of the nozzle inner tube, wherein the cross-sections is located at the flared inlet of the nozzle outer tube.

Example 2

Figure 3:
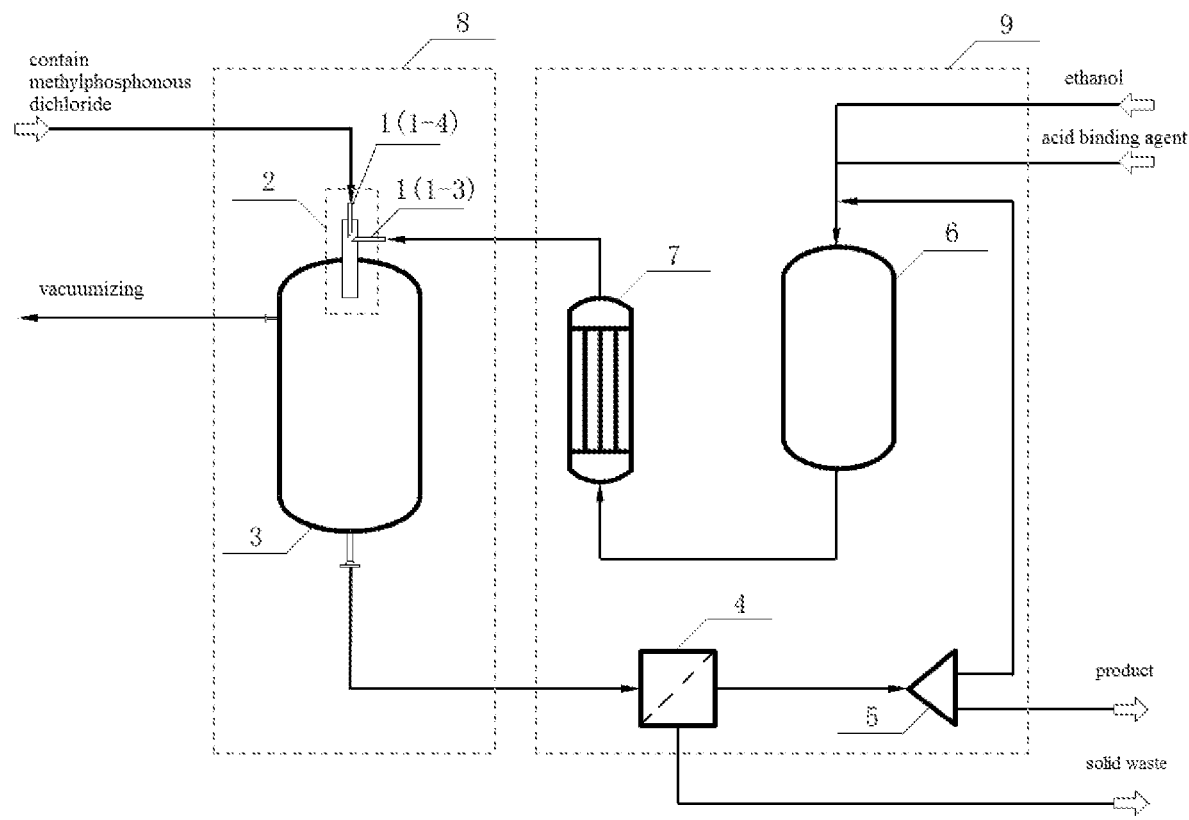
FIG. 3 is a schematic structure diagram showing the system for continuously producing diethyl methylphosphonite provided in Example 2.

FIG. 3 is a schematic structure diagram showing the system for continuously producing diethyl methylphosphonite provided in Example 2. The system includes a rapid mixing reactor (8) and a material circulation subsystem (9). An inlet of the rapid mixing reactor (8) is arranged with a rapid mixing member (2). The rapid mixing member (2) is a jet nozzle, as shown in FIG. 2. The material circulation subsystem (9) includes a filter (4), a material distributing unit (5), an acid-binding agent premixer (6) and a heat exchanger (7).

As shown in FIG. 3, the rapid mixing member (2) includes a first liquid inlet 1 (1-3) and a second liquid inlet 1 (1-4). The outlet of the rapid mixing reactor (8) is connected with the inlet of the filter (4) to remove the solid components generated in the rapid mixing reactor (8). The liquid outlet of the filter (4) is connected with the material distributing unit (5), wherein part of the liquid is collected as the product, and part of the liquid enters the acid-binding agent premixer (6). The outlet of the acid-binding agent premixer (6) is connected with the hot material flow inlet of the heat exchanger (7). The hot material flow outlet of the heat exchanger (7) is connected with the first liquid inlet 1 (1-3) of the rapid mixing member (2).

FIG. 4 is a schematic structure diagram of a jet nozzle. The jet nozzle is composed of an outer tube and two jet tubes, as shown in FIG. 4. One end of the jet tubes is connected with the liquid inlets, and the other end is a 45° cross-section cut. The two jet tubes are arranged with an included angle of 90°, and the cut sections of the two jet tubes are parallel to each other. On end of the nozzle outer tube is connected with the jet tube, the other end is communicated with the chamber of the rapid mixing reactor.

Example 3

Figure 5:
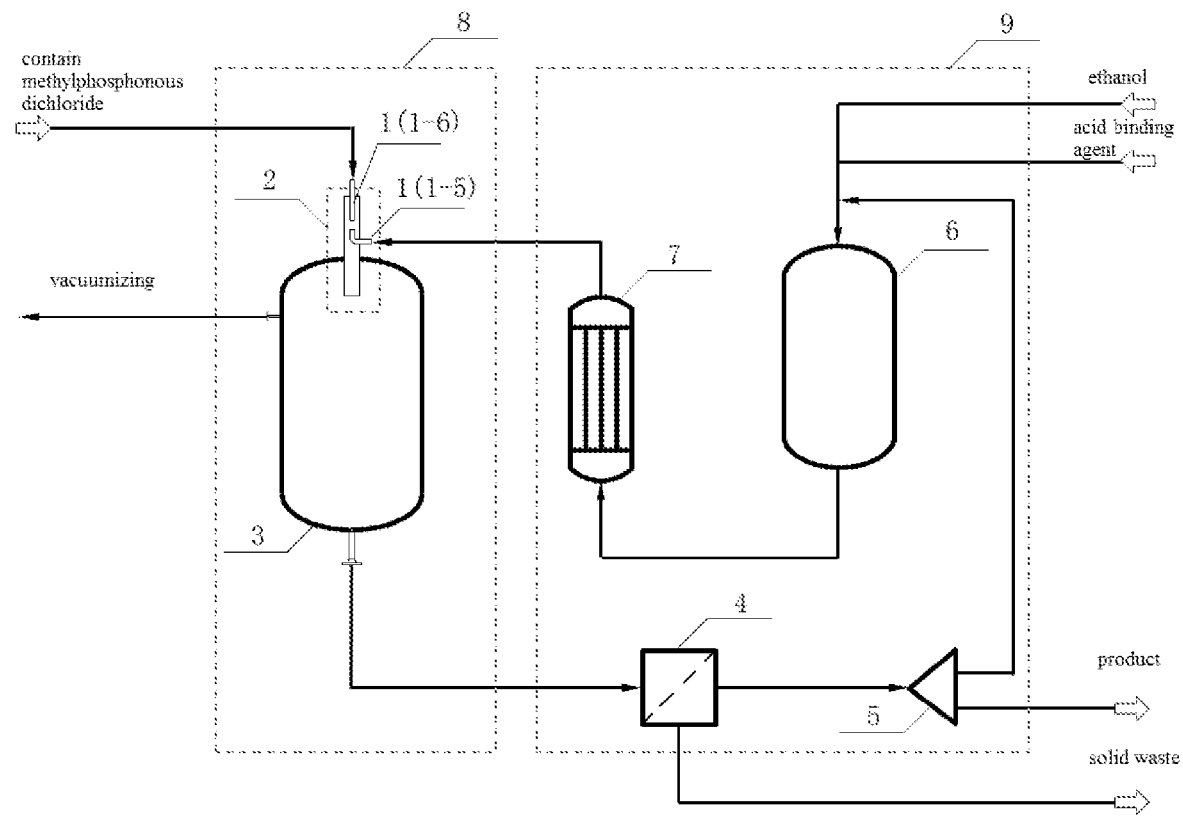
FIG. 5 is a schematic structure diagram showing the system for continuously producing diethyl methylphosphonite provided in Example 3.

FIG. 5 is a schematic structure diagram showing the system for continuously producing diethyl methylphosphonite provided in Example 3. The system includes a rapid mixing reactor (8) and a material circulation subsystem (9). An inlet of the rapid mixing reactor (8) is arranged with a rapid mixing member (2). The rapid mixing member (2) is a hedging flow nozzle, as shown in FIG. 6. The material circulation subsystem (9) includes a filter (4), a material distributing unit (5), an acid-binding agent premixer (6) and a heat exchanger (7).

As shown in FIG. 5, the rapid mixing member (2) includes a first liquid inlet 1 (1-5) and a second liquid inlet 1 (1-6). The outlet of the rapid mixing reactor (8) is connected with the inlet of the filter (4) to remove the solid components generated in the rapid mixing reactor (8). The liquid outlet of the filter (4) is connected with the material distributing unit (5), wherein part of the liquid is collected as the product, and part of the liquid enters the acid-binding agent premixer (6). The outlet of the acid-binding agent premixer (6) is connected with the hot material flow inlet of the heat exchanger (7). The hot material flow outlet of the heat exchanger (7) is connected with the first liquid inlet 1(1-5) of the rapid mixing member (2).

FIG. 6 is a schematic structure diagram of a hedging flow nozzle. The hedging flow nozzle is composed of an outer tube and two hedging tubes. One end of the each hedging tubes is connected with a liquid inlet, and the other end is a liquid injection port. The liquid injection ports of the two hedging tubes are in a hedging arrangement. One end of the nozzle outer tube is connected with a hedging tube, and the other end is communicated with the chamber of the rapid mixing reactor.

Example 4

The method for continuously producing diethyl methylphosphonite using the system provided in Example 1-3 includes the following main working processes.

In the processes of this example, an ethanol-containing reaction raw material, an acid-binding agent and a circulating material were well mixed in the acid-binding agent premixer (6) to obtain a mixed material (A). The mixed material (A) was cooled to a set temperature through the heat exchanger (7), and then entered the first liquid inlet 1 (1-1, 3, 5) of the rapid mixing reactor (8). A methylphosphonous dichloride-containing material (B) entered the second liquid inlet 1 (1-2, 4, 6) of the rapid mixing reactor (8). The methylphosphonous dichloride reacted with the ethanol in the rapid mixing reactor (8) and produced diethyl methylphosphonite, and at the same time the hydrogen chloride generated in the reaction reacted with the acid-binding agent in the material (A) and produced a corresponding salt of hydrochloric acid. The materials inside the rapid mixing reactor (8) entered the material circulation subsystem (9). The solid waste generated in the reaction was removed from the mixed material by a filter (4), and the liquid after the filtration entered the material distributing unit (5). The material distributing unit collected part of material (D) as a crude product to enter subsequent processing section, and the other part of material (C) entered the acid-binding agent premixer (6).

Example 5-17

The method for continuously producing diethyl methylphosphonite using the system provided in Example 1 includes the following main working processes.

In the processes of Examples 5-16, an ethanol-containing reaction raw material, ammonia and a circulating material were well mixed in the acid-binding agent premixer (6) to obtain a mixed material (A). The mixed material (A) was cooled to a set temperature through the heat exchanger (7), and then entered the first liquid inlet (1-1) of the rapid mixing reactor (8). A methylphosphonous dichloride-containing material (B) entered the second liquid inlet (1-2) of the rapid mixing reactor (8). The methylphosphonous dichloride reacted with the ethanol in the rapid mixing reactor (8) and produced diethyl methylphosphonite, and at the same time the hydrogen chloride generated in the reaction reacted with the ammonia in the material (A) and produced a corresponding ammonium chloride. The materials inside the rapid mixing reactor (8) entered the material circulation subsystem (9). The solid ammonium chloride generated in the reaction was removed from the mixed material by a filter (4), and the liquid after the filtration entered the material distributing unit (5). The material distributing unit collected part of material (D) as a crude product to enter subsequent processing section, and the other part of material (C) entered the acid-binding agent premixer (6).

In the process of Example 17, an ethanol-containing reaction raw material, ammonia and a solvent were well mixed in the acid-binding agent premixer (6) to obtain a mixed material (A). The mixed material (A) was cooled to a set temperature through the heat exchanger (7), and then entered the first liquid inlet (1-1) of the rapid mixing reactor (8). A methylphosphonous dichloride-containing material (B) entered the second liquid inlet (1-2) of the rapid mixing reactor. The methylphosphonous dichloride reacted with the ethanol in the rapid mixing reactor (8) and produced diethyl methylphosphonite, and at the same time the hydrogen chloride generated in the reaction reacted with the ammonia in the material (A) and produced a corresponding ammonium chloride. The materials inside the rapid mixing reactor (8) entered the material circulation subsystem (9). The solid ammonium chloride generated in the reaction was removed from the mixed material by a filter (4). The liquid after the filtration entered the material distributing unit (5) and all was collected as a crude product material (D) to enter a subsequent processing section.

Different operating conditions were optimized. The results under various parameter conditions are shown in Tables 1-3, wherein $T_1$ is the temperature of the materials A and B entering the reactor, $T_2$ is the temperature of the materials inside the rapid mixing reactor (8), R is the mass ratio of the material (C) to the material (D), $N_1$ is the molar ration of the ammonia to the methylphosphonous dichloride in the materials (A) and (B), $N_2$ is the molar ratio (1:x:y) of methylphosphonous dichloride/ethanol/solvent entering the system.

The content of diethyl methylphosphonite in the material (D) was analyzed by gas chromatography. The yield of the diethyl methylphosphonite was calculated as follows:

$$\text{diester yield} = \frac{\text{mass fraction of diethyl methylphosphonite} \times \text{mass flow of material } D/136\,\text{g}\cdot\text{mol}^{-1}}{\text{mass fraction of methylphosphonous dichloride} \times \text{mass flow of material } B/117\,\text{g}\cdot\text{mol}^{-1}}$$

In Examples 5-8, the effects of the molar ratio of the ammonia to methylphosphonous dichloride in the materials (A) and (B) on the diester yield were compared.

TABLE 1

| Examples | $T_1$ (° C.) | $N_1$ | $N_2$ | R | $T_2$ (° C.) | Diester yield (%) |
|---|---|---|---|---|---|---|
| 5 | −15.0 | 5.0 | 1:5:1.5 | 5 | 32.8 | 96.3 |
| 6 | −15.0 | 4.1 | 1:5:1.5 | 5 | 32.1 | 95.2 |
| 7 | −15.0 | 2.9 | 1:5:1.5 | 5 | 31.6 | 93.5 |
| 8 | −15.0 | 2.1 | 1:5:1.5 | 5 | 31.8 | 88.4 |

As shown in Table 1, the higher the molar ratio of the ammonia to methylphosphonous dichloride in the materials (A) and (B), the higher the yield of diethyl methylphosphonite.

In Examples 5 and 9-13, the effects of the temperature of the materials A and B entering the reactor on the diester yield were compared.

TABLE 2

| Examples | $T_1$ (° C.) | $N_1$ | $N_2$ | R | $T_2$ (° C.) | Diester yield (%) |
|---|---|---|---|---|---|---|
| 9 | −25.0 | 5.0 | 1:5:1.5 | 5 | 22.1 | 96.4 |
| 5 | −15.0 | 5.0 | 1:5:1.5 | 5 | 32.8 | 96.3 |
| 10 | −5.0 | 5.0 | 1:5:1.5 | 5 | 42.1 | 95.4 |
| 11 | 5.0 | 5.0 | 1:5:1.5 | 5 | 52.1 | 95.7 |
| 12 | 10.0 | 5.0 | 1:5:1.5 | 5 | 68.6 | 94.8 |
| 13 | 20.0 | 5.0 | 1:5:1.5 | 5 | 79.5 | 94.2 |

As shown in Table 2, with the increase of the temperature of the materials A and B entering the reactor, the overall yield of diethyl methylphosphonite remained at a relatively high level, although the yield decreased slightly, indicating that this reaction system and method for continuously producing diethyl methylphosphonite can in situ remove the hydrogen chloride causing the acidolysis of diethyl methylphosphonite, suppressing the occurrence of side-reaction fundamentally, thereby reducing the sensitivity of the reaction process to temperature and eliminating the need to arrange complicated heat exchange members inside the reactor, so that the equipment investment is reduced and the stability of the production is improved.

In Examples 6, and 14-16, the effects of the mass ratio of the material (C) to the material (D) on the diester yield were compared.

TABLE 3

In Examples 6, and 14-16, the effects of the mass ratio of the material (C) to the material (D) on the diester yield were compared.

| Examples | $T_1$ (° C.) | $N_1$ | $N_2$ | R | $T_2$ (° C.) | Diester yield (%) |
|---|---|---|---|---|---|---|
| 14 | −15.0 | 4.1 | 1:5:1.5 | 3 | 54.6 | 95.4 |
| 6 | −15.0 | 4.1 | 1:5:1.5 | 5 | 32.1 | 95.2 |
| 15 | −15.0 | 4.1 | 1:5:1.5 | 7 | 20.6 | 96.1 |
| 16 | −15.0 | 4.1 | 1:5:1.5 | 9 | 13.6 | 96.3 |

As shown in Table 3, with the increase of the mass ratio of the material (C) to the material (D), the yield of diethyl methylphosphonite did not change significantly, but the reaction temperature $T_2$ decreased gradually, indicating that increasing the mass ratio R of the material (C) to the material (D) can enhance the pre-cooling temperature $T_1$ of the material at the inlet, thereby reducing the precooling energy consumption of the reaction system.

The above description is only the preferred embodiments of the present disclosure. It should be noted that for those skilled in the art, various improvements and modifications may be made without departing from the principle of the present disclosure, and these improvements and modifications should fall within the scope of protection of this invention.

The invention claimed is:

1. A system for continuously producing diethyl methylphosphonite, comprising:
a mixing reactor and a material circulation subsystem;
wherein an inlet of the mixing reactor is provided with a mixing member comprising a first liquid inlet and a second liquid inlet, wherein the second liquid inlet is configured to feed a methylphosphonous dichloride-containing material;
wherein the material circulation subsystem comprises a filter, a unit for distributing materials, an acid-binding agent premixer and a heat exchanger that are sequentially connected, wherein the filter is further provided with a solid waste outlet, the unit for distributing materials is further provided with an diethyl methylphosphonite outlet, the acid-binding agent premixer is further provided with an reaction raw material inlet and an acid-binding agent inlet; wherein the reaction raw material inlet is configured to feed ethanol;
wherein an inlet of the filter is connected with an outlet of the mixing reactor, and an outlet of the heat exchanger is connected with the first liquid inlet;
wherein the mixing member is selected from a venturi nozzle, a jet nozzle or a hedging flow nozzle.

2. The system for continuously producing diethyl methylphosphonite according to claim 1, wherein the mixing reactor is further provided with a vacuumization unit.

3. The system for continuously producing diethyl methylphosphonite according to claim 1, wherein the filter is selected from the group consisting of a plate and frame filter, a leaf filter, a rotary drum filter, a centrifugal filter and combinations thereof.

4. The system for continuously producing diethyl methylphosphonite according to claim 1, wherein the acid-binding agent premixer is selected from the group consisting of an absorption tower, a bubbling bed, an airlift loop reactor, a jet reactor, a mechanically stirring tank and combinations thereof.

5. A method for continuously producing diethyl methylphosphonite using the system according to claim 1, comprising:
step a), mixing an ethanol-containing reaction raw material, an acid-binding agent and a material circulating in the unit for distributing materials in the acid-binding agent premixer uniformly, to obtain a mixed material;
step b), cooling the mixed material obtained in step a) by the heat exchanger and then introducing the mixed material into the mixing reactor via the first liquid inlet; and at the same time introducing a methylphosphonous dichloride-containing material into the mixing reactor via the second liquid inlet, and mixing the mixed material and the methylphosphonous dichloride-containing material under the action of the mixing member to carry out a reaction, to obtain a reaction mixture; and
step c), passing the reaction mixture obtained in step b) through a filter to remove solid waste generated from the reaction, and then introducing the reaction mixture into the unit for distributing materials, to obtain diethyl methylphosphonite and the material circulating in the unit for distributing materials separately, wherein the material circulating in the unit for distributing materials is used in step a).

6. The method for continuously producing diethyl methylphosphonite according to claim 5, wherein the acid-binding agent in step a) is an organic amine having a structural formula of $NR_1R_2R_3$;
wherein $R_1$, $R_2$, and $R_3$ are independently selected from H, methyl, ethyl, propyl, butyl or phenyl.

7. The method for continuously producing diethyl methylphosphonite according to claim 5, wherein in step b), the methylphosphonous dichloride in the methylphosphonous dichloride-containing material and the ethanol and the acid-binding agent in the mixed material have a molar ratio of 1:(0.5-50):(1-15).

8. The method for continuously producing diethyl methylphosphonite according to claim 5, wherein in step b), the reaction is performed at a temperature from −40° C. to 100° C.

9. The method for continuously producing diethyl methylphosphonite according to claim 5, wherein in step c), the diethyl methylphosphonite and the material circulating in the unit for distributing materials obtained from the unit for distributing materials have a mass ratio of 1:(0.1-100).

* * * * *